(No Model.)

H. W. FISHEL.
BOUTONNIERE.

No. 489,671.  Patented Jan. 10, 1893.

WITNESSES:
Paul Johst
C. Sedgwick

INVENTOR
H. W. Fishel
BY Munn & Co
ATTORNEYS.

UNITED STATES PATENT OFFICE.

HENRY W. FISHEL, OF NEW YORK, N. Y.

BOUTONNIÈRE.

SPECIFICATION forming part of Letters Patent No. 489,671, dated January 10, 1893.

Application filed November 4, 1892. Serial No. 450,961. (No model.)

*To all whom it may concern:*

Be it known that I, HENRY W. FISHEL, of New York city, in the county and State of New York, have invented a new and Improved Boutonnière, of which the following is a full, clear, and exact description.

My invention relates to improvements in boutonnières or buttonhole bouquets; and the object of my invention is to produce a simple device of this kind in which the flower is artificial, which is adapted to be easily attached to or detached from the buttonhole of a garment, which is constructed in such a way that it is strong and durable and not very liable to fall apart, which is made so that only the flower is visible on the exterior of a garment, and which is adapted to perfectly simulate a natural flower.

To these ends my invention consists in the particular construction and arrangement of parts, as will be hereinafter described and claimed.

Reference is to be had to the accompanying drawings forming a part of this specification, in which similar figures of reference indicate corresponding parts in all the views.

Figure 1:
Figure 2:
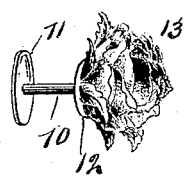
Figure 3:
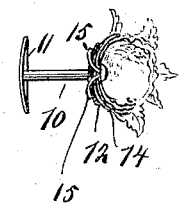
Figure 4:
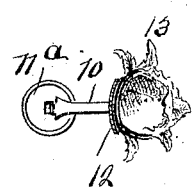

Figure 1 is a perspective view showing the application of the boutonnière to the coat of a man; Fig. 2 is a detail perspective view of the boutonnière; Fig. 3 is a side elevation, with parts in section; and Fig. 4 is a sectional elevation of the boutonnière having its stud provided with a lever base.

The invention consists in part of a stud having the usual stem 10, a base 11 in the center of which the stem is secured, and a socket 12 held to the outer end of the stem and adapted to carry the flower 13. The flower 13 may be made to simulate any flower and its leaves may be conveniently made of celluloid, although the flower and the entire device may be made of porcelain, metal, or any suitable material. The leaves of the flower are preferably held together by a split pin 14 which extends through the inner portion of the leaves, and the prongs 15 of which diverge and are held in slots in the socket 12. The base of the flower conforms exteriorly to the shape of the socket so that it fits firmly therein, and if desired the flower may be cemented to the socket, as shown in Fig. 4, instead of being fastened to the pin.

In Figs. 2 and 3 I have shown a stud with a fixed base 11, but it may have a lever base 11ª like the ordinary lever studs, or the stud may be of any approved construction. It will be seen that the flower is held firmly to the stud socket, and when applying the boutonnière to a garment it is only necessary to insert the base of the stud in the buttonhole.

I am aware that artificial flowers with movable leaves have been attached to tubes, such being shown in the patent to Potts, No. 190,248, dated May 1, 1877, but such flowers are poorly adapted for use as boutonnières, as the petals soon get loose and the construction is defective and expensive. The boutonnière embodying my invention, on the other hand, is very strong and compact and may be very cheaply made.

Having thus described my invention, I claim as new, and desire to secure by Letters Patent,—

A boutonnière, comprising a buttonhole stud having at its outer end a perforated socket, an artificial flower held within the socket, and a split pin extending through the leaves or petals of a flower and through the perforations in the socket, substantially as described.

HENRY W. FISHEL.

Witnesses:
  C. SEDGWICK,
  WARREN B. HUTCHINSON.